United States Patent
Miller Higgins et al.

(10) Patent No.: US 10,995,810 B2
(45) Date of Patent: May 4, 2021

(54) FRICTION MATERIAL

(71) Applicant: BorgWarner Inc., Auburn Hills, MI (US)

(72) Inventors: Deanna L. Miller Higgins, Berkley, MI (US); Feng Dong, Rochester, MI (US); Robert Lam, Rochester, MI (US)

(73) Assignee: BorgWarner Inc., Auburn Hills, MI (US)

( * ) Notice: Subject to any disclaimer, the term of this patent is extended or adjusted under 35 U.S.C. 154(b) by 62 days.

(21) Appl. No.: 16/427,951

(22) Filed: May 31, 2019

(65) Prior Publication Data

US 2019/0368563 A1    Dec. 5, 2019

Related U.S. Application Data

(60) Provisional application No. 62/678,830, filed on May 31, 2018.

(51) Int. Cl.
*F16D 69/02* (2006.01)
*F16D 13/64* (2006.01)
(Continued)

(52) U.S. Cl.
CPC ............ *F16D 69/026* (2013.01); *B32B 5/24* (2013.01); *B32B 5/30* (2013.01); *B32B 27/42* (2013.01);
(Continued)

(58) Field of Classification Search
CPC .. F16D 69/026; F16D 13/64; F16D 2069/004; B32B 5/18; B32B 15/046; B32B 27/065
See application file for complete search history.

(56) References Cited

U.S. PATENT DOCUMENTS 5,639,804 A    6/1997    Yesnik
5,707,905 A    1/1998    Lam et al.
(Continued)

FOREIGN PATENT DOCUMENTS

CN    1500850 A    6/2004
CN    1603379 A    4/2005
(Continued)

OTHER PUBLICATIONS

English language abstract for CN 1500850 extracted from espacenet.com database on Feb. 24, 2020, 1 page.
(Continued)

*Primary Examiner* — Hai Vo
(74) *Attorney, Agent, or Firm* — Howard & Howard Attorneys PLLC

(57) ABSTRACT

A friction material has a first outermost surface and a second outermost surface spaced apart from the first outermost surface. The friction material includes a base which forms at least a portion of the first outermost surface. The base includes fibers present in an amount of from 20 to 80 weight percent, a filler present in an amount of from 20 to 80 weight percent, and a deposit which forms at least a portion of the second outermost surface and includes a friction adjusting agent. The friction material further includes a resin disposed throughout the friction material. The deposit is disposed in the friction material in a gradated pattern. At least a portion of the deposit is exposed to the environment and the second outermost surface has a surface roughness of from 2 to 11 micrometers as determined by non-contact laser measurement according to ISO 25178.

20 Claims, 6 Drawing Sheets

(51) Int. Cl.
 *B32B 27/42* (2006.01)
 *B32B 5/30* (2006.01)
 *B32B 5/24* (2006.01)
 *F16D 69/00* (2006.01)

(52) U.S. Cl.
 CPC ........ *F16D 13/64* (2013.01); *B32B 2260/021* (2013.01); *B32B 2260/025* (2013.01); *B32B 2260/046* (2013.01); *B32B 2262/0269* (2013.01); *B32B 2262/062* (2013.01); *B32B 2264/1021* (2020.08); *F16D 2069/004* (2013.01); *Y10T 428/24999* (2015.04); *Y10T 428/249962* (2015.04); *Y10T 428/249986* (2015.04)

(56) References Cited

U.S. PATENT DOCUMENTS

| | | | |
|---|---|---|---|
| 5,753,356 | A | 5/1998 | Lam et al. |
| 5,858,883 | A | 1/1999 | Lam et al. |
| 5,998,307 | A | 12/1999 | Lam et al. |
| 6,194,059 | B1 | 2/2001 | Yesnik |
| 6,524,681 | B1 * | 2/2003 | Seitz ........................ D06N 7/00 104/18 |
| 6,630,416 | B1 | 10/2003 | Lam et al. |
| 6,716,314 | B2 | 4/2004 | Johnson et al. |
| 6,875,711 | B2 | 4/2005 | Chen et al. |
| 7,090,746 | B2 | 8/2006 | Petschauer et al. |
| 8,021,744 | B2 | 9/2011 | Lam et al. |
| 8,394,452 | B2 | 3/2013 | Dong et al. |
| 8,951,763 | B2 | 2/2015 | Kim et al. |
| 2004/0033341 | A1 | 2/2004 | Lam et al. |
| 2005/0064778 | A1 | 3/2005 | Lam et al. |
| 2005/0075021 | A1 | 4/2005 | Lam et al. |
| 2005/0075022 | A1 | 4/2005 | Lam |
| 2005/0075413 | A1 | 4/2005 | Lam |
| 2005/0075414 | A1 | 4/2005 | Lam et al. |
| 2005/0281971 | A1 * | 12/2005 | Lam ...................... F16D 69/026 428/36.4 |
| 2006/0008635 | A1 | 1/2006 | Dong et al. |
| 2006/0241207 | A1 | 10/2006 | Lam et al. |
| 2010/0304631 | A1 | 12/2010 | Dong et al. |
| 2011/0189460 | A1 | 8/2011 | Chavdar |
| 2012/0108698 | A1 | 5/2012 | Lam et al. |
| 2013/0037373 | A1 | 2/2013 | Dong et al. |
| 2014/0225310 | A1 | 8/2014 | Yaguchi et al. |
| 2015/0031787 | A1 | 1/2015 | Bares et al. |

FOREIGN PATENT DOCUMENTS

| | | |
|---|---|---|
| CN | 1624356 A | 6/2005 |
| CN | 1699799 A | 11/2005 |
| CN | 1721176 A | 1/2006 |
| CN | 103038335 A | 4/2013 |
| EP | 1203897 A1 | 5/2002 |
| EP | 1521001 A2 | 4/2005 |
| EP | 1750031 A2 | 2/2007 |
| JP | 2007045860 A | 2/2007 |

OTHER PUBLICATIONS

English language abstract for Cn 1603379 extracted from espacenet.com database on Feb. 24, 2020, 1 page.
English language abstract for CN 1624356 extracted from espacenet.com database on Feb. 24, 2020, 1 page.
English language abstract and machine-assisted English translation for CN 1699799 extracted from espacenet.com database on Feb. 24, 2020, 4 pages.
English language abstract for CN 1721176 extracted from espacenet.com database on Feb. 24, 2020, 1 page.
English language abstract for CN 103038335 extracted from espacenet.com database on Feb. 24, 2020, 1 page.
International Search Report for Application No. PCT/US2016/068480 dated Apr. 10, 2017, 5 pages.
Engineered Fibers Technology, "EFTec Nanofibrillated Fibers", 2015, 3 pages.
Keyence, "Keyence TV Webpage and Video", https://www.keyence.com/keyence-tv/VK-X200_3D_Laser_Scanning_Microscope.jsp, 1 page.
Onyx Papers, "Onyx Papers Webpage", 2016, http://onyxpapers.com, 3 pages.
English language abstract for JP 2007-045860 extracted from espacenet.com database on Jan. 4, 2021, 1 page.

* cited by examiner

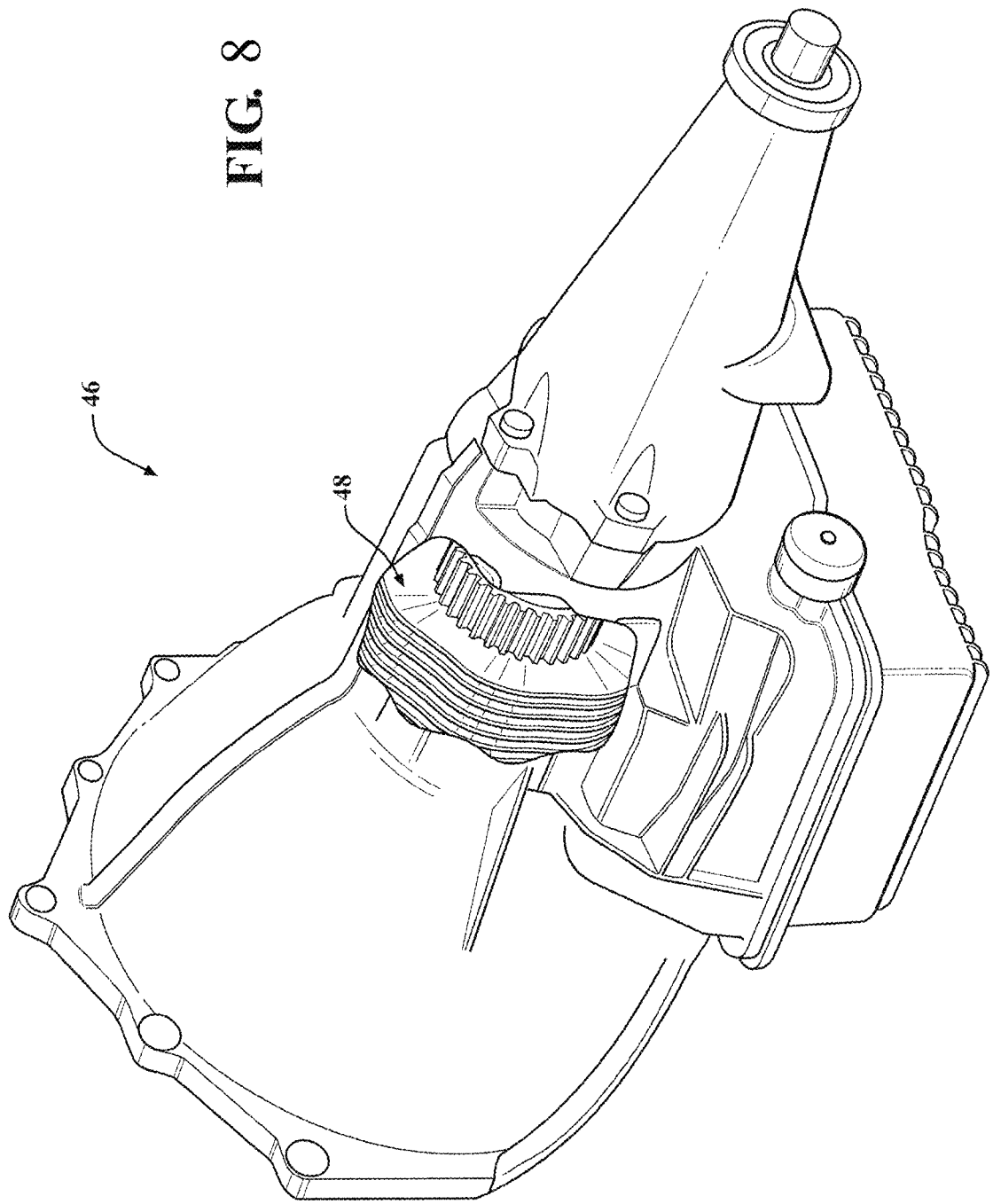

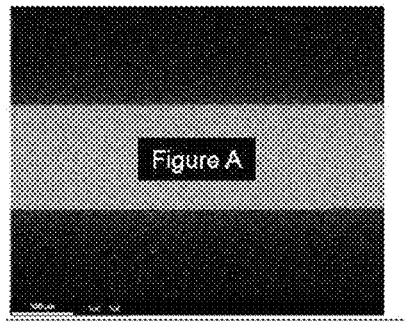 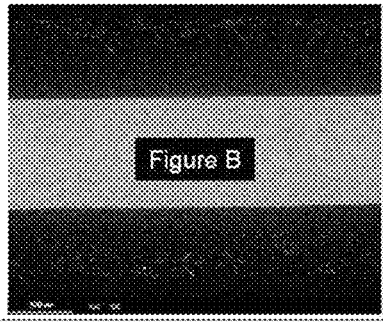 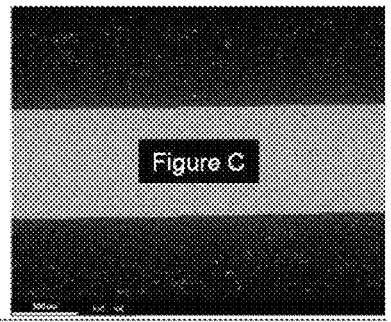
FIG. 9A     FIG. 9B     FIG. 9C
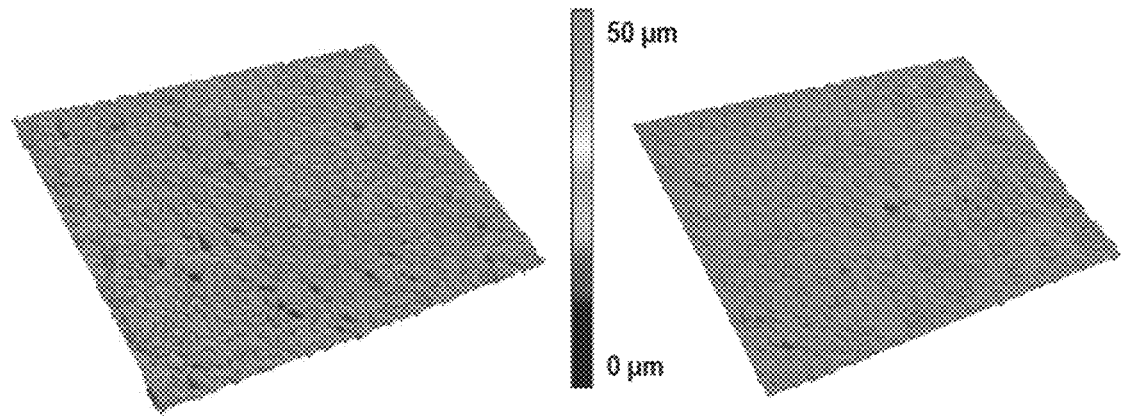
FIG. 10A     FIG. 10B

# FRICTION MATERIAL

CROSS-REFERENCE TO RELATED APPLICATIONS

The present application claims priority to and all the benefits of U.S. Provisional Patent Application No. 62/678,830 filed May 31, 2018, the contents of which are hereby expressly incorporated herein by reference in their entirety.

FIELD OF THE DISCLOSURE

This disclosure generally relates to a friction material that includes a base including fibers and a filler, a deposit including a friction adjusting agent, and a resin disposed throughout the friction material. More specifically, this disclosure relates to a friction material that has a second outermost surface with a particular surface smoothness and that can be used in a friction plate in a clutch assembly in a transmission.

BACKGROUND

Several components of a motor vehicle powertrain may employ a wet clutch to facilitate the transfer of power from the vehicle's power generator (i.e., an internal combustion engine, electric motor, fuel cell, etc.) to drive the wheels. A transmission located downstream from the power generator that enables vehicle launch, gear shifting, and other torque transfer events is one such component. Some form of a wet clutch may be found throughout many different types of transmissions currently available for motor vehicle operation. A wet clutch may be utilized in a torque converter for an automatic transmission, a multi-plate wet clutch pack for an automatic transmission or a semi-automatic dual-clutch transmission (DCT), and a wet start clutch that may be incorporated into a sportier automatic transmission equipped with as many as seven to nine gears as a substitute for the torque converter, to name but a few examples. Similar wet clutches may be found elsewhere in the vehicle powertrain besides the transmission.

A wet clutch is an assembly that interlocks two or more opposed, rotating surfaces in the presence of a lubricant by imposing selective interfacial frictional engagement between those surfaces. A friction clutch plate, a band, a synchronizer ring, or some other part that provides one of these engageable rotating surfaces typically supports a friction material to effectuate the intended interlocking frictional engagement. The presence of the lubricant at the friction interface cools and reduces wear of the friction material and permits some initial slip to occur so that torque transfer proceeds gradually, although very quickly, in an effort to avoid the discomfort that may accompany an abrupt torque transfer event (i.e., shift shock). However, maintaining the lubricant at the friction interface has an adverse impact on fuel efficiency. This is because the power needed to pump the lubricant, usually under pressure, to and from the friction interface at a flow rate that keeps the surface of the friction material below a certain temperature is ultimately siphoned from the power generator.

In many applications, transmission and torque-on-demand systems incorporate slip clutches mainly for the fuel efficiency and driving comfort. The role of a slip clutch within these systems varies from vehicle launching devices, such as wet start clutches, to that of torque converter clutches. According to the operating conditions, the slip clutch can be differentiated into three principle classes: (1) Low Pressure and High Slip Speed Clutch, such as wet start clutch; (2) High Pressure and Low Slip Speed Clutch, such as Converter Clutch; and (3) Extreme Low Pressure and Low Slip Speed Clutch, such as neutral to idle clutch.

The principal performance concerns for most slip clutch applications are the prevention of shudder and the energy management of the friction material. The occurrence of shudder can be attributed to many factors including the friction characteristics of the friction material, the mating surface's hardness and roughness, oil film retention, lubricant chemistry and interactions, clutch operating conditions, driveline assembly and hardware alignment, and driveline contamination. Energy management is primarily concerned with controlling the temperature of the friction material and may be affected by the pump capacity, oil flow path and control strategy.

New and advanced transmission systems are being developed by the automotive industry. In many applications, the friction material must be durable and have high heat resistance in order to be useful in the advanced transmission systems. Typically, the friction material must also remain stable at high temperatures and be able to rapidly dissipate the high heat that is being generated during operating conditions.

Conventional friction materials generally cannot function reliably at surface temperatures above 300-350° C. which may result from high surface speeds. Above those temperatures, such friction materials tend to suffer from lubricant thermal degradation and glazing, which is a process in which the surface of the friction material accumulates thermally degraded lubricant additives to form a substantially impenetrable sludge deposit. A surface-glazed friction material may contribute to a variety of complications including shuddering and an inconsistent coefficient of friction across the friction interface. The amount of the lubricant that needs to be circulated over the friction material to sustain a low enough surface temperature depends on the configuration of the wet clutch and the surface area of the friction interface between the opposed, rotating surfaces.

Previously, asbestos fibers were included in friction materials for temperature stability. Due to health and environmental problems, asbestos is no longer used. More recent friction materials have attempted to overcome the absence of the asbestos in the friction material by modifying impregnated paper or fibers with phenolic or phenolic-modified resins. These friction materials have a tendency to not rapidly dissipate the high heat generated, and may not have the necessary heat resistance and satisfactory high coefficient of friction performance now needed for use in the high speed systems currently being developed.

The high speeds that are typically generated during engagement and disengagement of the new transmission systems usually require that the friction material be able to maintain a relatively constant friction throughout engagement, i.e., frictional engagement. It may also be important that the frictional engagement be relatively constant over a wide range of speeds and temperatures in order to minimize "shuddering".

To provide desired friction during engagement and disengagement, friction modifiers, e.g. friction adjusting particles, may be used. However, when these modifiers are used on the surface of the friction materials, they provide a surface that lacks smoothness and regularity which, in turn, leads to variances in friction, potential formation of hotspots, etc. If such surfaces are processed, e.g. ground down, to increase smoothness, the friction modifiers are also removed from the surface, thereby rendering such friction materials unsuitable for use.

It may also be important that the friction material have a desired torque curve shape so that during frictional engagement, the friction material is noise or "squawk" free. For example, in a torque curve of a shifting engagement, if the torque is greater at the end of the curve than the beginning, then shudder is likely to occur. On the contrary, if the torque curve is greater at the beginning of the curve than the end, then shudder is unlikely. Minimized "fade" is desirable. In view of the above, there remains an opportunity to develop an improved friction material.

BRIEF DESCRIPTION OF THE FIGURES

Other advantages of the present invention will be readily appreciated, as the same becomes better understood by reference to the following detailed description when considered in connection with the accompanying drawings. The individual components in one or more of the drawings may not be shown to scale.

FIG. 8 is a perspective view of a transmission having a cut-out showing a clutch assembly.

FIGS. 9A-C are Energy Dispersive Spectroscopy (EDS) maps of SEM images with iron (Fe) shown in bright grey as a central layer and silicone (Si) shown in white as specs dispersed throughout the two exterior layers of friction material.

FIG. 10A is a non-contacting laser profilometry 3D image representative of a friction material and the outermost surface thereof before post process smoothing.

FIG. 10B is a non-contacting laser profilometry 3D image representative of a friction material and an outermost surface thereof after post process smoothing.

SUMMARY OF THE DISCLOSURE

Figure 1:
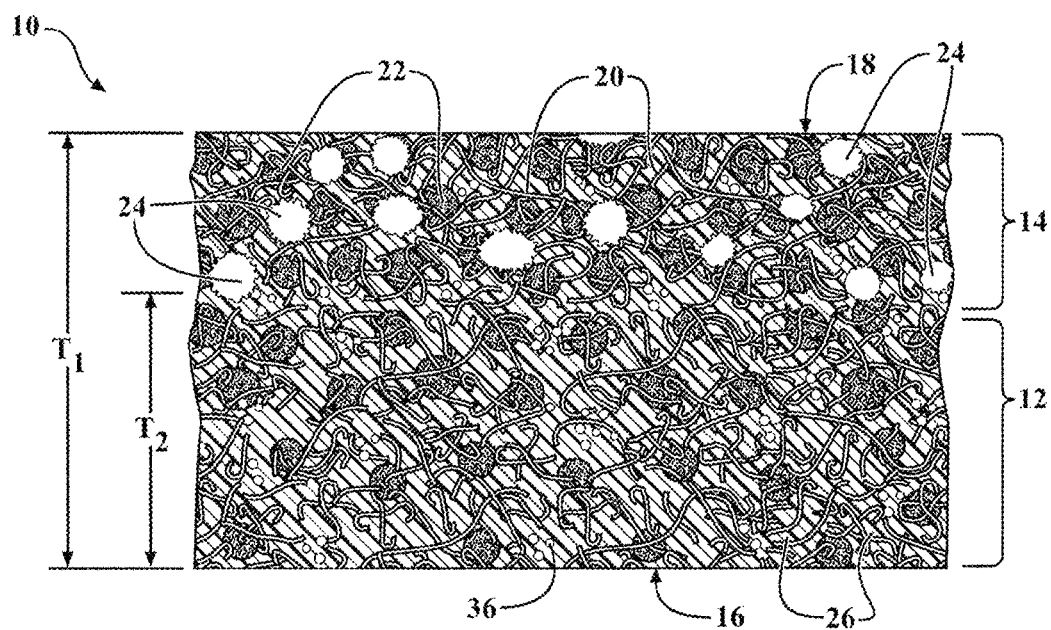
FIG. 1 is a cross-sectional view of one embodiment of a friction material including a base and a deposit.
Figure 2:
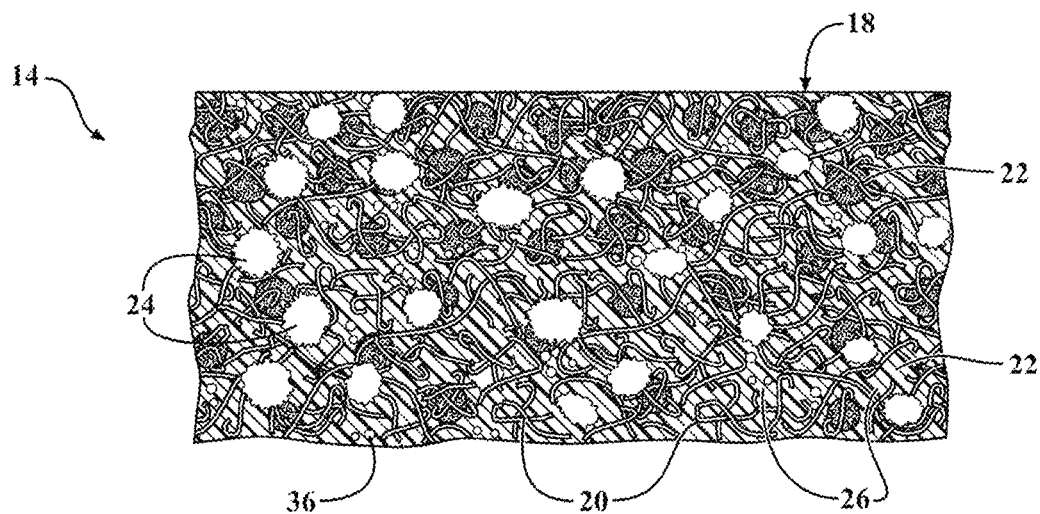
FIG. 2 is a cross-sectional view of one embodiment of a deposit.

A friction material has a first outermost surface and a second outermost surface spaced apart from the first outermost surface. The friction material includes a base which forms at least a portion of the first outermost surface. The base includes fibers present in an amount of from 20 to 80 weight percent, based on a total weight of the base. The base also includes a filler present in an amount of from 20 to 80 weight percent, based on a total weight of the base. The friction material also includes a deposit which forms at least a portion of the second outermost surface and includes a friction adjusting agent. The friction material further includes a resin disposed throughout the friction material. The deposit is disposed in the friction material in a gradated pattern measured in a direction from the second outermost surface towards the first outermost surface wherein a concentration of the deposit disposed nearest the second outermost surface is greater than a concentration of the deposit disposed nearest the first outermost surface. Moreover, at least a portion of the deposit is exposed to the environment and the second outermost surface has a surface roughness of from 2 to 11 micrometers as determined by non-contact laser measurement according to ISO 25178.

DETAILED DESCRIPTION OF THE DISCLOSURE

The subject disclosure includes a friction material (10) and a friction plate (30) including the friction material (10) and a substrate (32). The friction material (10) described herein is typically used on a friction plate (30) which can be, for example, included in a wet clutch assembly in a transmission (46) of a motor vehicle. In other words, the friction material (10) is typically designed to be adhered to the substrate (32), such as a steel plate, to form the friction plate (30), as is known in the art. The metal plate has two surfaces and the friction material (10) may be adhered to one or both of these surfaces, e.g. with any adhesive known in the art. The friction plate (30) may be used, sold, or provided with a separator plate to form a clutch pack or clutch assembly (48). It is to be appreciated that the friction material (10) and friction plate (30) described herein can be used in other vehicular applications and has applications beyond motor vehicles.

The friction material (10) has a first outermost surface (16) for adhesion to the substrate (32) (such as the metal plate). The first outermost surface (16) may be the bonding surface described below. The friction material (10) also has a second outermost surface (18) for exposure to the environment (which may be the friction generating surface described below).

Friction Material:

The friction material (10) includes a base (12), a deposit (14) including a friction adjusting agent (22), and a resin (26/34) disposed throughout the friction material (10). Each of these is described in greater detail below. The friction material (10) may be described as single-ply, meaning that it is a single layer and is not two (2)-ply. In other words, the friction material (10) does not include two distinct layers as would be present in a two-ply structure.

Base:

As shown in FIGS. 1-5, the friction material (10) includes the base (12). The base (12) may be alternatively described as a base layer, as a primary layer, or as a porous layer. If a layer, the layer is typically not discrete and well defined relative to edges and/or demarcation. Instead, the layer is typically indiscrete and may blend into the deposit (14), as described in greater detail below. For example, the layer may blend into the deposit (14) in a gradient type of pattern. Alternatively, the deposit (14) may blend into the base (12) in a gradient type of pattern, as described in greater detail below.

The total thickness of the base (12) ($T_2$) is typically from 0.3 to 1, e.g. 0.3 to 0.9, 0.4 to 0.8, 0.5 to 0.7, 0.6 to 0.7, less than 0.4 mm, alternatively from 0.3 mm to 0.9 mm, or from 0.4 to 0.8, mm. In additional non-limiting embodiments, all values and ranges of values within and including the aforementioned range endpoints are hereby expressly contemplated. This thickness may refer to a thickness prior to, or after, bonding to the metal plate. In additional non-limiting embodiments, all values and ranges of values within and including the aforementioned range endpoints are hereby expressly contemplated.

Fibers:

As shown in FIGS. 1-5, the base (12) includes fibers (20). The fibers are typically present in an amount of from 20 to 80 weight percent, based on a total weight of the base (12). In various embodiments, the fibers are present in an amount of from 25 to 75, 30 to 70, 35 to 65, 40 to 60, 45 to 55, or 45 to 50, weight percent, based on a total weight of the base (12). In additional non-limiting embodiments, all values and ranges of values within and including the aforementioned range endpoints are hereby expressly contemplated.

The fibers (20) are not particularly limited in type and may be chosen from cotton fibers, carbon fibers, aramid fibers, cellulose fibers, acrylic fibers, and combinations thereof. In other embodiments, the fibers (20) are one or combinations of the aforementioned fiber types. All weight ranges and ratios of the various combinations of the aforementioned fiber types are hereby expressly contemplated in various non-limiting embodiments.

In various embodiments, the fibers (20) may be further defined as being, including, consisting of, or consisting essentially of any of those described above, e.g. AB homopolymers, AABB polymers, etc. Relative to aramid fibers, as is known in the art, aramids are generally prepared by the reaction between an amine group and a carboxylic acid halide group. Simple AB homopolymers may look like $nNH_2—Ar—COCl \rightarrow —(NH—Ar—CO)_n—+nHCl$. Various non-limiting examples of aramids include Kevlar, Twaron, Nomex, New Star and Teijinconex, which are AABB polymers. Nomex, Teijinconex and New Star include predominantly meta-linkages and are poly-metaphenylene isophthalamides (MPIA). Kevlar and Twaron are both p-phenylene terephthalamides (PPTA), the simplest form of the AABB para-polyaramide. PPTA is a product of p-phenylene diamine (PPD) and terephthaloyl dichloride (TDC or TCl). One or more types of aramids can be used. In one embodiment, the aramid is poly-paraphenylene terephthalamide. In another embodiment, the aramid is or includes two or more types of aramids, e.g. a first poly-paraphenylene terephthalamide and a second poly-paraphenylene terephthalamide that is different from the first. In one embodiment, Twaron products are used. In other embodiments, Kevlar is used. In still other embodiments, other aramids are used.

In certain embodiments, the presence of carbon fibers aids in increasing thermal resistance, maintaining a steady coefficient of friction and increasing the squeal resistance. Carbon fibers can provide good heat conduction such that the friction material (10) has a desired heat resistance. In other embodiments, the use of aramid fibers and carbon fibers improves the ability of the friction material (10) to withstand high temperatures.

In other embodiments, the cellulose fibers contribute to surface smoothness of the friction material (10), thereby making the friction material (10) more stable during operation. In certain embodiments the cellulose fibers include fibers that have a flat and wide surface. The flat, wide cellulose fibers can retain more friction adjusting agent on the surface of the individual fibers making up the base (12). In some embodiments, cellulose fibers that are derived from wood are used, such as birch fibers and/or eucalyptus fibers. The cellulose fibers can also improve the friction material's (10) "break-in" characteristics at an economical cost.

In further embodiments, cotton fibers aid in providing shear strength to the friction material (10). The cotton fibers typically have fibrillated strands attached to a main fiber core and aid in preventing delamination of the friction material during use. In still other embodiments, the acrylic fibers may be, or be formed from, one or more synthetic acrylic polymers such as those formed from at least 85% by weight acrylonitrile monomers.

In various embodiments, when two or more types of fibers (20) are used, each of the fibers (20) may be present in any amount from 1 to 99 weight percent based on a total combined weight of the fibers (20) (or 1 to 80 weight percent based on a total weight of the base (12)), so long as the total weight of all fibers (20) used is from 20 to 80 weight percent, based on a total weight of the base (12). For example, any one or more individual fibers (20) may be utilized in an amount of 1, 5, 10, 15, 20, 25, 30, 35, 40, 45, 50, 55, 60, 65, 70, 75, or 80, weight percent based on a total weight of the base (12). In some embodiments, two types of fibers (20) are used wherein a first types of fiber (20) is used in an amount of from 5 to 50, 10 to 45, 15 to 40, 20 to 35, 35 to 30, 20 to 40, 20 to 35, 20 to 30, 20 to 25, 25 to 40, 25 to 35, 25 to 30, weight percent based on a total weight of the base (12), and a second type of fiber (20) is used in a balance amount such that the total weight percent of the fibers is from 20 to 80 weight percent, based on a total weight of the base (12), as described above. In additional non-limiting embodiments, all values and ranges of values within and including the aforementioned range endpoints are hereby expressly contemplated.

In additional embodiments, the base (12) includes from 50 to 75%, and in certain embodiments 65 to 70%, by weight, aramid fibers, when combined with 25 to 50%, and in certain embodiments 20 to 30%, by wt., cellulose fibers. In other embodiments, the base (12) includes from 50 to 75%, and in certain embodiments 65 to 70%, by wt., 25 to 50%, and in certain embodiments 20 to 30%, by wt., cellulose fibers, and 0 to 15%, and in certain embodiments 5 to 10%, by wt., carbon fibers.

In various embodiments, the fibers (20) may have diameters from 1 μm to 500 μm and lengths from 2 mm to 20 mm. The fibers may be woven, non-woven, or any other suitable construction. In additional non-limiting embodiments, all values and ranges of values within and including the aforementioned range endpoints are hereby expressly contemplated. The fibers (20) may be alternatively described as a plurality of fibers (20).

In various embodiments, the fibers (20) have a length from 0.5 to 10 mm and a Canadian Standard Freeness (CSF) of greater than 300. In other embodiments, less fibrillated fibers (20) are utilized which have a CSF of 450 to 550, e.g. from 530 to 550. In other embodiments, the fibers (20) have CSF of 580 to 650 or greater than 650. In contrast, more fibrillated fibers, such as aramid pulp, have a freeness of 285-290. In additional non-limiting embodiments, all values and ranges of values within and including the aforementioned range endpoints are hereby expressly contemplated.

The terminology "Canadian Standard Freeness" (T227 om-85) describes that the degree of fibrillation of fibers can be described as the measurement of freeness of the fibers. The CSF test is an empirical procedure which gives an arbitrary measure of the rate at which a suspension of three grams of fibers in one liter of water may be drained. Therefore, less fibrillated fibers (20) have higher freeness or higher rate of drainage of fluid from the friction material (10) than other fibers (20) or pulp. Friction materials (10) including fibers (20) having a CSF from 430 to 650 can provide superior friction performance and have better material properties than friction materials (10) including more fibrillated fibers (20). Longer fiber length, together with high Canadian Standard Freeness, tend to provide a friction material (10) with high porosity and good wear resistance. Less fibrillated fibers (20) (CSF of 530 to 650) may exhibit good long-term durability and stable coefficients of friction.

In addition, the base (12) may also include a latex, e.g. in an amount of from 0 to 1, 2, or 3%, or any range thereof.

Filler:

In addition to the fibers (20), and as also shown in FIGS. 1-5, the base (12) also includes a filler (24) present in an amount of from 20 to 80 weight percent based on a total weight of the base (12). In various embodiments, the filler (24) is present in an amount of from 25 to 75, 30 to 70, 35 to 65, 40 to 60, 45 to 55, or 45 to 50, weight percent, based on a total weight of the base (12). In additional non-limiting embodiments, all values and ranges of values within and including the aforementioned range endpoints are hereby expressly contemplated.

The filler (24) is not particularly limited and may be any known in the art. For example, the filler (24) may be a reinforcing filler or a non-reinforcing filler. The filler (24) may be chosen from silica, diatomaceous earth, graphite, and combinations thereof. In various embodiments, the filler (24) is diatomaceous earth. The filler (24) may be free of silica.

In other embodiments, the filler (24) is, includes, consists essentially of, or consists of silica, carbon, graphite, alumina, magnesia, calcium oxide, titania, ceria, zirconia, cordierite, mullite, sillimanite, spodumene, petalite, zircon, silicon carbide, titanium carbide, boron carbide, hafnium carbide, silicon nitride, titanium nitride, titanium boride, and combinations thereof. For example, such an embodiment may include graphite but be free of silica and/or diatomaceous earth. In various additional embodiments, the filler (24) is, includes, consists essentially of, or consists of, diatomaceous earth. Diatomaceous earth is a mineral including silica. Of course, all of the particles of the filler (24) may be diatomaceous earth or, alternatively, may include a combination of different types of particles such as various combinations of diatomaceous earth, carbon, graphite, and alumina. The type or types of filler (24) may vary depending on the physical characteristics sought.

In various embodiments, the base (12) further includes graphite, either as part of the filler (24) or independently therefrom. For example, in some embodiments, the base (12) may further include graphite in an amount of up to 20 weight percent based on a total weight of the base (12). If the graphite is included, it will be included in an amount of greater than zero and typically less than 20, weight percent based on a total weight of the base (12). In various embodiments, the graphite is present in an amount of from 1 to 20, 2 to 19, 3 to 18, 4 to 17, 5 to 16, 6 to 15, 7 to 14, 8 to 13, 9 to 12, 10 to 11, 5 to 10, 5 to 15, 5 to 19, 10 to 15, 10 to 19, or 15 to 19, weight percent based on a total weight of the base (12). In additional non-limiting embodiments, all values and ranges of values within and including the aforementioned range endpoints are hereby expressly contemplated.

In other embodiments, the graphite is included in any amount that is described above relative to the filler (24) itself, e.g. in an amount of from 31 to 49, 32 to 48, 33 to 47, 34 to 46, 35 to 45, 36 to 44, 37 to 43, 38 to 42, 39 to 41, 30 to 45, 30 to 40, 30 to 35, 35 to 49, 35 to 45, 35 to 40, 40 to 49, 40 to 45, or 45 to 49, weight percent based on a total weight of the base (12). Said differently, the graphite can be the filler (24) itself and thereby be present in any amount described above in which the filler (24) itself can be present. In additional non-limiting embodiments, all values and ranges of values within and including the aforementioned range endpoints are hereby expressly contemplated. The terminology "consists essentially of" may describe embodiments that include one or more of the aforementioned fillers (24) and that are simultaneously free of one or more of the aforementioned fillers (24).

The role of the filler (24) is typically to affect the pore size of the friction material (10) and may also affect elasticity/compression, each described in greater detail below. For example, when the size of individual particles of the filler (24) is larger, the particles do not pack together as tightly when the friction material (10) is formed. This tends to lead to the formation of larger pore sizes. Conversely, when the size of the individual particles of the filler (24) is smaller, the particles pack together more tightly when the friction material (10) is formed. This tends to lead to the formation of smaller pore sizes.

In various embodiments, the filler (24) may be chosen from any one or more of the friction adjusting agents (22) described below. Alternatively, any one of the friction adjusting agents (22) below may be chosen from any one or more of the fillers (24) described above. Depending on type, amount utilized, and location, the filler (24) may act as, or share characteristics with, a friction adjusting agent (22) and/or the friction adjusting agent (22) may act as, or share characteristics with, a filler (24).

The filler (24) and/or friction adjusting agent (22) may have a particle size from 0.5 to 80 microns, e.g. from 0.5 to 20 microns. The particle size can be used to customize three-dimensional structure of the friction material (10), e.g. to maximize heat dissipation. In additional non-limiting embodiments, all values and ranges of values within and including the aforementioned range endpoints are hereby expressly contemplated.

Figure 5:
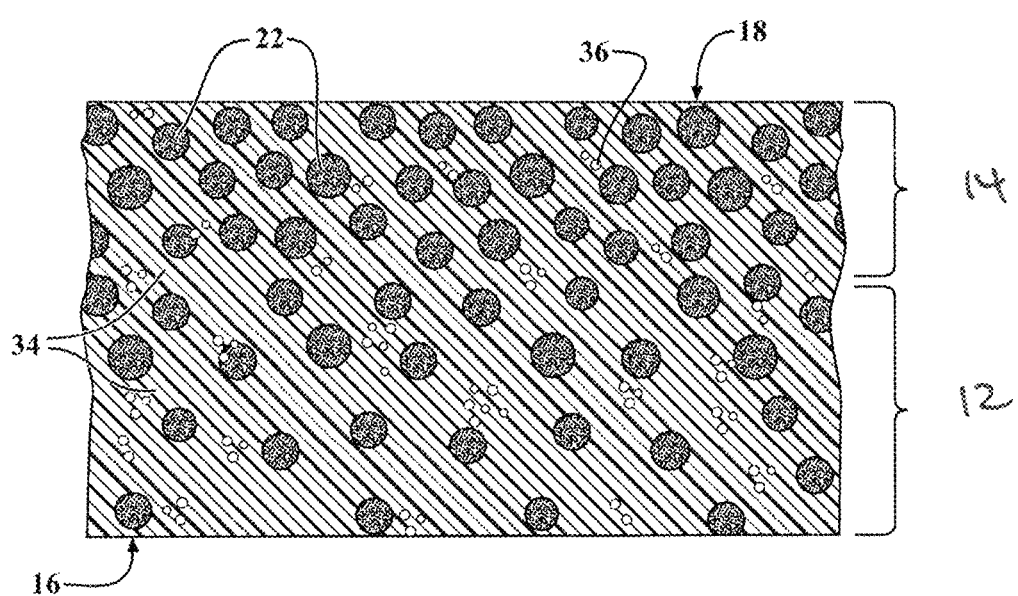
FIG. 5 is a cross-sectional view of the friction material showing one generic embodiment of the gradated pattern of the deposit, wherein various other components of the friction material are not shown.
Figure 6:
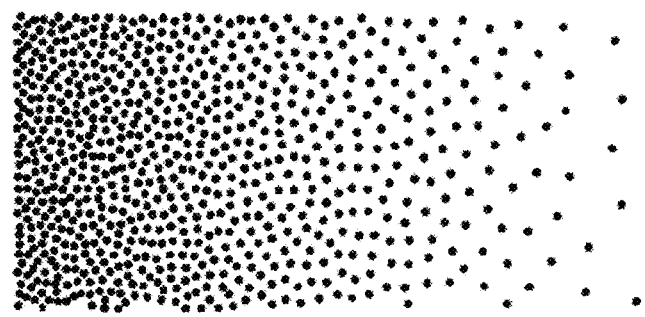
FIG. 6 is a representation of a generic two-dimensional gradient.

Deposit:

As shown in FIGS. 1-5, the friction material (10) also includes the deposit (14). Typically the deposit (14) is disposed in the friction material (10) in a gradated pattern measured in a direction from the second outermost surface (18) towards the first outermost surface (16) wherein a concentration of the deposit (14) disposed nearest the second outermost surface (18) is greater than a concentration of the deposit (14) disposed nearest the first outermost surface (16). A generic example of a two-dimensional gradated pattern is shown in FIG. 5. The gradated pattern may alternatively be described as a gradient or gradient pattern. The gradated pattern of this disclosure may be two-dimensional or three-dimensional.

The deposit (14) may be alternatively described as including the friction adjusting agent (22), as described in greater detail below. Accordingly, the friction material (10) may be further described as one wherein particles of the friction adjusting agent (22) are disposed in the gradated or gradient pattern, as described anywhere herein. Said differently, it may be the particles themselves that are disposed in a gradated pattern such that the deposit (14), in a broad sense, may or may not be disposed in a gradated or gradient pattern.

It is also contemplated that the deposit (14) may be alternatively described as being disposed in a lowered orientation in comparison to the second outermost surface (18). Said differently, the deposit (14) and/or the particles of the friction adjusting agent (22) may be disposed at a particular depth below the (plane of the) second outermost surface (18), either before or both before and after smoothing or grinding, as is described in greater detail below. For example, the deposit (14) may be disposed at a depth of from 5 to 20 μm from the second outermost surface (18) prior to smoothing or grinding. Typically, after smoothing or grinding, at least a portion of the deposit is exposed to the environment (i.e., and is disposed on or with the second outermost surface (18)).

The gradated pattern may be continuous (e.g. uninterrupted and/or consistently changing) or stepped, e.g. discontinuous or changing in one or more steps. The terminology gradated pattern typically describes a graded change in the amount of the deposit (14). In one embodiment, the gradated pattern may be further defined as a vector field which points in the direction of the greatest rate of increase and whose magnitude is the greatest rate of change. In another embodiment, the gradated pattern may be further defined as a series of two-dimensional vectors at points on the friction material (10) or the base (12) with components given by the derivatives in horizontal and vertical directions. At each point, the vector may point in the direction of largest possible increase, and the length of the vector corresponds to the rate of change in that direction.

Typically, the gradated pattern is formed during formation of the friction material (10) via application of a vacuum of a particular strength to draw the deposit (14) and/or particles of the friction adjusting agent (22) down into the base (12)/friction material (10). Without intending to be bound by any particular theory, it is believed that, in this process, the deposit (14) and/or particles of the friction adjusting agent (22) are drawn downwards such that a gradated or gradient pattern is formed. Accordingly, there is typically a higher concentration of the deposit (14) and/or the particles of the friction adjusting agent (22) at areas closer to the second outermost surface (18) than there are further down towards the first outermost surface (16).

The combination of the base (12) and the deposit (14) typically form what can be described as raw paper. Typically, the terminology "raw paper" describes embodiments that are free of the resin (26/34) (whether cured or uncured).

The surface of the raw paper may be alternatively described as a friction generating surface (18). At least a portion of the deposit (14) is exposed to the environment. In other words, at least a portion of the deposit (14) may be described as part of, or as, the friction generating surface (18).

Friction Adjusting Agent:

As shown in FIGS. 1-5, the deposit (14) includes the friction adjusting agent (22). The terminology "friction adjusting agent" may include or be particles of various compounds. For example, the friction adjusting agent (22) may be chosen from silica, diatomaceous earth, rubber, graphite, cashew nut, and combinations thereof. In various embodiments, the friction adjusting agent (22) is, includes, consists essentially of, or consists of, silica and/or diatomaceous earth. In other embodiments, the friction adjusting agent (22) is, includes, consists essentially of, or consists of silica, carbon, graphite, alumina, magnesia, calcium oxide, titania, ceria, zirconia, cordierite, mullite, sillimanite, spodumene, petalite, zircon, silicon carbide, titanium carbide, boron carbide, hafnium carbide, silicon nitride, titanium nitride, titanium boride, and combinations thereof. In various additional embodiments, the friction adjusting agent (22) is, includes, consists essentially of, or consists of, diatomaceous earth. Diatomaceous earth is a mineral comprising silica. Diatomaceous earth is an inexpensive, abrasive material that exhibits a relatively high coefficient of friction. In other embodiments, silica particles such as diatomaceous earth, and/or silicon dioxide are utilized. The silica particles are inexpensive organic materials which may bond strongly to the fibers. Of course, all of the particles of the friction adjusting agent (22) may be diatomaceous earth or, alternatively, may include a combination of different types of particles such as various combinations of diatomaceous earth, carbon, graphite, and alumina. CELITE® and CELATOM® are two trade names of diatomaceous earth that may be used. The terminology "consists essentially of" may describe embodiments that include one or more of the aforementioned friction adjusting agents (22) and that are simultaneously free of one or more of the aforementioned friction adjusting agents (22). For example, such an embodiment may include graphite but be free of silica and/or diatomaceous earth. In other embodiments, the friction adjusting agent (22) is chosen from silica particles, resin powders such as phenolic resins, silicone resins, epoxy resins and mixtures thereof, partially and/or fully carbonized carbon powders and/or particles, and combinations thereof. In various embodiments, the friction adjusting agent (22) provides a high coefficient of friction to the friction material (10). The type or types of friction adjusting agents (22) utilized may vary depending on the friction characteristics sought. Some types of friction adjusting agents (22) may also provide the friction material (10) with a smooth friction surface and provide a good "shift feel" and friction characteristics to the friction material (10) such that any "shudder" is minimized, when used, for example, in a transmission (46).

The friction adjusting agent (22) may provide a three-dimensional surface to the base (12). In various embodiments, the friction adjusting agent (22) is in particle form. For example, uniformity of friction modifying particles may be achieved by using a range and size of particles that is from 0.5 to 80 microns, e.g. from 0.5 to 20 microns. In various embodiments, the particles of the friction adjusting agent (22) have an average diameter of from 100 nm to 80 µm, from 500 nm to 30 µm, or from 800 nm to 20 µm. In some embodiments, if the friction modifying particle size is too large or too small, an optimum three-dimensional structure is not achieved and, consequently, heat dissipation is not optimum. In additional non-limiting embodiments, all values and ranges of values within and including the aforementioned range endpoints are hereby expressly contemplated.

In various embodiments, the friction adjusting agent (22) is elastomeric particles that are elastic and exhibit rubber-like properties. Various suitable elastomeric particles are particles derived from cashew nut shell oil, rubber, and combinations thereof. In some embodiments, the elastomeric particles are rubber particles including, consisting essentially of, or consisting of silicone rubber, styrene butadiene rubber ("SBR"), butyl rubber, and halogenated rubbers such as chlorobutyl rubber, bromobutyl rubber, polychloroprene rubber, and nitrile rubber. In some embodiments, the elastomeric particles include, consist essentially of, or consist of, silicone rubber. In other embodiments the elastomeric particles include, consist essentially of, or consist of, nitrile rubber. In another embodiment, the elastomeric particles include the elastomeric particles which include, consist essentially of, or consist of, cashew nut particles or particles derived from cashew nut shell oil. The terminology "consists essentially of" may describe embodiments that include one or more types of the aforementioned compounds and be free of one or more other types of the aforementioned compounds.

In various embodiments, the elastomeric particles have average diameters of less than 40 µm, alternatively from 2 µm to 40 µm, alternatively from 5 µm to 30 µm, alternatively from 5 µm to 15 µm. Advantageously, elastomeric particles of the friction generating layer having an average diameter of less than 40 μm typically improve compression and may unexpectedly yield a friction material (10) having an improved static coefficient of Friction (COF). Further, in various embodiments, the elastomeric particles have a thermal stability of 200° C. or greater, alternatively 300° C. or greater, alternatively 400° C. or greater (and have an upper value for thermal stability as would be understood by those of skill in the art). The terminology "thermal stability" describes that the elastomeric particles do not melt, soften, or decompose. The thermal stability of the elastomeric particles is typically determined by thermal gravimetric analysis ("TGA"). The temperature at which a sample of the elastomeric particles analyzed via TGA begins to lose weight is the temperature at which the elastomeric particles lose thermal stability.

In various embodiments, the friction adjusting agent (22) is utilized in an amount of from 2 kg to 5 kg based on 80 kg to 90 kg of a total of the base (12) and the deposit (14). In other embodiments, the amount of the friction material (10) is 2.5 to 4.5, 3 to 4, or 3.5 to 4, kg, based on 80 kg to 90 kg of a total of the base (12) and the deposit (14). In still other embodiments, the amount of the friction material (10) is based on 81 to 89, 82 to 88, 83 to 87, 84 to 86, or 85 to 86, kg, of a total of the base (12) and the deposit (14). In additional non-limiting embodiments, all values and ranges of values within and including the aforementioned range endpoints are hereby expressly contemplated.

In further embodiments, the friction adjusting agent (22) is utilized in an amount of from 3 to 20 lbs per 3000 ft$^2$ (1.4 to 9.1 kg per 278.71 m$^2$) of a surface of the friction material (10), alternatively from 3 to 12 lbs per 3000 ft$^2$ (1.4 kg to 5.4 kg per 278.71 m$^2$) of the surface of the friction material (10), alternatively from 3 to 9 lbs per 3000 ft$^2$ (1.4 kg to 4.1 kg per 278.71 m$^2$) of the surface of the friction material (10), and alternatively 6 lbs per 3000 ft$^2$ (2.7 kg per 278.71 m$^2$) of the surface of the friction material (10). In additional non-limiting embodiments, all values and ranges of values within and including the aforementioned range endpoints are hereby expressly contemplated. The amounts described immediately above are in units of lbs. per 3000 ft$^2$, which are units customarily used in the paper making industry as a measurement of weight based on given a surface area of a thin layer. Above, the units express the weight of the friction adjusting agent (22) for every 3000 ft$^2$ of the surface of the base (12) and deposit (14), which may also be described as the friction generating surface (18).

Resin:

As shown in FIGS. 1-5, the friction material (10) also includes the resin (26/34) disposed or dispersed throughout the friction material (10). In other words, the resin (26/34) may be dispersed homogeneously or heterogeneously throughout the friction material (10). In various embodiments, the resin (26/34) is dispersed homogeneously or heterogeneously throughout the base (12) and may partially or wholly encapsulate one or more of the deposit (14), the filler(s) (24), and/or the friction adjusting agent(s) (22). In the Figures, the numeral 26 refers to an uncured resin. Also in the Figures, the numeral 34 refers to a partially cured or completely cured resin.

The resin (26/34) may be any known in the art and may be cured or curable. Alternatively, the resin (26) may be of the type that does not cure. In various embodiments, depending on the stage of formation of the friction material (10), the resin (34) may be partially cured, entirely cured, or less than entirely cured. Alternatively, the resin (26) may not be cured at all. The resin (26/34) may be cured, uncured, or partially cured, depending on which stage of the manufacturing process is reviewed.

In various embodiments, the resin (26/34) may be any thermosetting resin suitable for providing structural strength to the friction material (10). Various resins that may be utilized include phenolic resins, phenolic-based resins, and phenolic-modified resins. A phenolic resin is a class of thermosetting resins that is produced by the condensation of an aromatic alcohol, typically a phenol, and an aldehyde, typically a formaldehyde. A phenolic-based resin is a thermosetting resin blend that typically includes at least 50 wt. % of a phenolic resin based on the total weight of all resins and excluding any solvents or processing acids. It is to be understood that various phenolic-based resins may include modifying ingredients, such as epoxy, butadiene, silicone, tung oil, benzene, cashew nut oil and the like. In phenolic-modified resins, the phenolic resin is generally present at 50% or greater by weight (excluding any solvents present). However, in one or more embodiments, the resin (26/34) may include, for example, 5 to 80%, by weight of a silicone resin based on the weight of the mixture of the silicone-phenolic resin mixture (excluding solvents and other processing acids). Examples of phenolic and phenolic-silicone resins that may be used are described in U.S. Pat. No. 5,998,307, which is expressly incorporated herein in its entirety in various non-limiting embodiments.

Silicone resins that may be used may include thermal curing silicone sealants and silicone rubbers. Various silicone resins may also be used such as those that include D and T units (DT resins) or M and Q units (MQ resins) or the combinations (MDT, MTQ, QDT, etc. resins). In still other embodiments, an epoxy modified phenolic resin which includes 5 to 25 percent, by weight of an epoxy compound with the remainder (excluding solvents and other processing aids) phenolic resin, may also be used.

In various embodiments, the resin (26/34) is present in an amount of from 25 to 80 weight percent based on a total weight of the base (12) and the deposit (14). For example, the resin (26/34) may be present in an amount of from 25 to 75, 25 to 70, 30 to 75, 30 to 70, or 30 to 55, or 35 to 65, weight percent based on a total weight of the base (12) and the deposit (14). This value may be alternatively described as resin "pick up." The weight basis for the above amounts may alternatively be based on a total weight of the fibers (20) and the friction adjusting agent (22). In additional non-limiting embodiments, all values and ranges of values within and including the aforementioned range endpoints are hereby expressly contemplated. Once cured, the resin (34) confers strength and rigidity to the friction material (10) and adheres the fibers (20), filler particles (24), etc., while maintaining a desired porosity for proper lubricant flow and retention.

Porous Layer:

In additional embodiments, the base (12) is further defined as a porous layer and particles of the friction adjusting agent (22) are disposed in or throughout the porous layer. The porous layer may include a second outermost surface (18) and a first outermost surface (16). The first outermost surface (16) may be the bonding surface described above. The porous layer may further define an upper quadrant (38) disposed closest to the first outermost surface (16) and a lower quadrant (40) disposed closest to the second outermost surface (18). Particles of the friction adjusting agent (22) may be disposed in the upper quadrant (38) of the porous layer.

Physical Properties of the Friction Material:

As shown in FIGS. 1-5, the friction material (10) typically defines pores (36), e.g. a plurality of pores (36). Each of the pores (36) has a pore size. The average, or mean, pore size is typically represented as a distribution. The pore size may be determined using ASTM D4404-10. In various embodiments, the median pore size is, or alternatively the range of all pore sizes in the friction material (10) is, from 0.5 µm to 50 µm, 1 µm to 50 µm, 5 µm to 50 µm, 10 µm to 45 µm, 15 µm to 40 µm, 20 µm to 35 µm, 25 µm to 30 µm, 30 µm to 35 µm, 5 µm to 15 µm, 5 µm to 10 µm, 10 µm to 15 µm, 10 µm to 20 µm, 5 µm to 20 µm, 5 µm to 7 µm, 7 µm to 10 µm, or 7 µm to 15 µm, as determined using ASTM D4404-10. In additional non-limiting embodiments, all values and ranges of values within and including the aforementioned range endpoints are hereby expressly contemplated.

In other embodiments, the friction material (10) has a porosity of from 60% to 85% as determined using ASTM D4404-10. The porosity of the friction material (10) can be alternatively described as a percentage of the total friction material (10) that is open to air or the percentage of the total friction material (10), based on volume, that is air or not solid. In various embodiments, the friction material (10) has a porosity of from 60 to 80, 60 to 75, 60 to 70, 60 to 65, 65 to 85, 65 to 75, 65 to 70, 70 to 85, 70 to 80, 70 to 75, 75 to 85, 75 to 80, or 80 to 85, %, as determined using ASTM D4404-10. In still other embodiments, the friction material (10) has a porosity of 60, 61, 62, 63, 64, 65, 66, 67, 78, 69, or 70, %, as determined using ASTM D4404-10. In additional non-limiting embodiments, all values and ranges of values within and including the aforementioned range endpoints are hereby expressly contemplated.

In various embodiments, the friction material (10) exhibits improved anti-shudder characteristics along with improved elasticity/compression and/or porosity which allows for more uniform heat dissipation during use. Fluids in transmissions can rapidly move through the pores (36) of the friction material (10). Further, improved elasticity/compression and/or porosity provides more uniform pressure or even pressure distribution on the friction material (10) such that uneven lining wear or "hot spots" are minimized.

The more porous the structure of the friction material (10), the more efficiently heat is dissipated. The oil flow in and out of the friction material (10) during engagement of the friction material (10) during use occurs more rapidly when the friction material (10) is porous. For example, when the friction material (10) has a higher mean flow pore diameter and porosity, the friction material (10) is more likely to run cooler or with less heat generated in a transmission due to better automatic transmission fluid flow throughout the pores (36) of the friction material (10). During operation of a transmission system, oil deposits on the friction material (10) tend to develop over time due to a breakdown of automatic transmission fluid, especially at high temperatures. The oil deposits tend to decrease the size of the pores (36). Therefore, when the friction material (10) is formed with larger pores (36), the greater the remaining/resultant pore size after oil deposit. Porosity of the friction material (10) may be further modified based on choice of the fibers, resin, filler, filler particle size, and raw paper weight.

In various embodiments, the friction material (10) may have high porosity such that there is a high fluid permeation capacity during use. In such embodiments, it may be important that the friction material (10) not only be porous, but also be compressible. For example, the fluids permeated into the friction material (10) typically must be capable of being squeezed or released from the friction material (10) quickly under the pressures applied during operation of the transmission, yet the friction material (10) typically must not collapse. It may also be important that the friction material (10) have high thermal conductivity to also help rapidly dissipate the heat generated during operation of the transmission.

The total thickness of the friction material (10) ($T_1$), without the resin, is typically from 0.3 to 1.6, from 0.4 to 1.5, from 0.5 to 1.4, from 0.6 to 1.3, from 0.7 to 1.2, from 0.8 to 1.1, or from 0.9 to 1, mm. This thickness refers to a thickness prior to bonding to the metal plate and may be referred to as caliper thickness. This thickness ($T_1$) is typically the thickness of the fibers/base including the deposit (e.g. raw paper without resin). In additional non-limiting embodiments, all values and ranges of values within and including the aforementioned range endpoints are hereby expressly contemplated.

After bonding to the metal plate, the total thickness of the friction material (10) ($T_3$) is typically from 0.3 to 1.2, from 0.4 to 1.1, from 0.5 to 1, from 0.6 to 0.9, or from 0.7 to 0.8, mm. This thickness ($T_3$) is typically the thickness of the fibers/base including the deposit and resin and is measured after bonding to the metal plate. In additional non-limiting embodiments, all values and ranges of values within and including the aforementioned range endpoints are hereby expressly contemplated.

In still other embodiments, the friction material (10) has a compression of from 6 to 8, from 6 to 7, or from 7 to 8, percent, at 2 MPa. Compression is a material property of the friction material (10) that may be measured when the friction material (10) is disposed on the metal plate (i.e., measured when part of the friction plate, below) or when the friction material (10) is not disposed on the metal plate. Typically, compression is a measurement of a distance (e.g. mm) that the friction material (10) is compressed under a certain load. For example, a thickness of the friction material (10) before a load is applied can be measured. Then, the load may be applied. Subsequently, the new thickness of the friction material (10) after the load is applied for a certain time period is then measured. The new thickness is measured when the friction material (10) is under the load. The compression is different than the bounce-back/rebound properties of the friction material (10). Typically, the compression is reported as a ratio of (thickness before load is applied):(thickness after load is applied for a certain time). In the aforementioned compression range, the load used to generate the 6-8% is 2 MPa. The 6-8% compression may be alternatively reported as a 6-8% loss in thickness after the load is applied when compared to the original thickness before the load is applied. The compression is typically related to elasticity, as would be understood by those of skill in the art. The more elastic the friction material (10) is, the more return that will be observed after compression. This typically leads to less lining loss and formation of less hot spots, both of which are desirable. In additional non-limiting embodiments, all values and ranges of values within and including the aforementioned range endpoints are hereby expressly contemplated.

Compression of the friction material (10) may be further modified based on choice of the fibers, resin, filler, filler particle size, and raw paper weight. In additional non-limiting embodiments, all values and ranges of values within and including the aforementioned range endpoints are hereby expressly contemplated.

In various embodiments, the friction material (10)/friction plate (30) exhibits a percent compression from 10 to 30 percent or from 10 to 20 percent, e.g. from 11 to 19, 12 to 18, 13 to 17, 14 to 16, or 15, percent, as determined after measuring the thickness of the fibers and filler (24) (without resin (26/34); also known as "raw paper") before bonding to the substrate (32) as compared to the thickness of the friction material (10) (including the cured resin (34)) after bonding to the substrate (32), as is understood by those of skill in the art. In various embodiments, the compression may be calculated using $T_1$ and $T_3$, as first introduced above. In additional non-limiting embodiments, all values and ranges of values within and including the aforementioned range endpoints are hereby expressly contemplated.

In still other embodiments, the friction material (10) of this disclosure, e.g. when used to form a friction plate (30), has a final lining thickness after curing of the resin (34) and bonding to the metal plate, of from 0.4 to 1.2 mm. In other embodiments, this thickness is from 0.5 to 1.1, from 0.6 to 1, from 0.7 to 0.9, or from 0.8 to 0.9, mm. This may be alternatively described as $T_3$, as first introduced above. In additional non-limiting embodiments, all values and ranges of values within and including the aforementioned range endpoints are hereby expressly contemplated.

In even further embodiments, the friction material (10) of this disclosure, e.g. when used to form a friction plate (30), does not exhibit any hot spots and/or heat stains, as would be understood by those in the art, after 10, 50, 100, 200, 500, 1000, or 2000, cycles, wherein a cycle is understood by those of skill in the art. In additional non-limiting embodiments, all values and ranges of values within and including the aforementioned range endpoints are hereby expressly contemplated.

In addition, at least a portion of the deposit (14) is exposed to the environment and the second outermost surface (18) has a surface roughness of from 2 to 11 micrometers as determined by non-contact laser measurement according to ISO 25178. In various embodiments, the second outermost surface (18) has a surface roughness of 3, 4, 5, 6, 7, 8, 9, or 10, micrometers as determined by non-contact laser measurement according to ISO 25178. In additional non-limiting embodiments, all values and ranges of values within and including the aforementioned range endpoints are hereby expressly contemplated.

Additional Non-Limiting Embodiments:

In other embodiments, the friction material (10) is free of carbon fiber(s). In further embodiments, the friction material (10) is free of silica. Alternatively, the friction material (10) may be free of graphite. Similarly, the friction material (10) may be free of any one or more of the aforementioned fillers (24) and/or friction adjusting agents (22) that are described in detail above. The friction material (10) may be free of some types of fibers (20) (e.g. those of particular size or fibrillation), such as any of those described above, so long as some fibers (20) are utilized to form the friction material (10).

In additional non-limiting embodiments, the friction material (10) includes the friction generating (also known as interfacing) surface (18) that experiences interfacial frictional engagement with an opposed mating surface (e.g. a surface of a separator plate) in the presence of a lubricant. Located at and adjacent to the friction generating surface (18) are the base (12) and deposit (14) that includes the friction adjusting agent (22) that is adhered with the (cured) resin (26/34). The fibers (20) may include emanating fibrils that form an interconnected web that holds particles of the friction adjusting agent (22) and keeps them disposed at or near the friction generating surface (18). Some of the fibers (20) and/or particles of the friction adjusting agent (22) may be exposed at the friction generating surface (18) for contact with the opposed mating surface during frictional engagement. The ability of the web to keep the particles of the friction adjusting agent (22) at or near the friction generating surface (18) can provide the friction material (10) with a stable coefficient of friction. Moreover, in some instances, the fibers (20) can have an anti-glazing effect if they are susceptible to thermal decomposition. The thermal decomposition of the fibers (20) can help resist glazing by stripping surface-deposited (14) glaze material from the friction generating surface (18) and constantly exposing fresh fibers (20).

In still other embodiments, the friction material (10) may have a thickness defined by the distance between the friction generating surface (18) and an oppositely facing bonding surface (16). The oppositely facing bonding surface (16) is the surface of the friction material (10) where bonding to the substrate (32) or other material (such as the metal plate) is meant to be accomplished. A friction stability region that extends from the friction generating surface (18) towards the oppositely facing bonding surface (16) may include a balanced amount of the fibers (20) and particles of the friction adjusting agent (22). The friction stability region may extend from the friction generating surface (18) to a depth up to 40%, up to 20%, up to 10%, or up to 5% of the thickness of the friction material (10). For example, if the friction material (10) is 0.25 mm to 2 mm thick, the friction stability region may extend inwards from the friction generating surface (18) to a depth up to 0.0125 mm (5% of 0.25 mm) to 0.80 mm (40% of 2 mm). The rest of the friction material (10) underlying the friction stability region can have the same general construction as the friction stability region or a different construction. In additional non-limiting embodiments, all values and ranges of values within and including the aforementioned range endpoints are hereby expressly contemplated.

In various embodiments, the friction material (10) is bonded to the substrate (32) by any suitable technique known to skilled artisans. Several examples of the substrate (32) include, but are not limited to, a clutch plate, a synchronizer ring, and a transmission band. The friction material (10) may include the friction generating surface (18) and an oppositely facing bonding surface (16). The friction generating surface (18) can experience select interfacial frictional engagement with the opposed, rotating surface in the presence of a lubricant and the oppositely facing bonding surface (16) achieves bonded attachment to the substrate (32) with the aid of an adhesive or some other suitable bonding technique. The lubricant may be any suitable lubricating fluid such as, for example, an automatic transmission fluid. The flow rate of the lubricant over the friction material (10) can be managed to allow the temperature at the friction generating surface (18) to exceed 350° C. for extended periods in an effort to improve fuel efficiency. In various embodiments, while the friction material (10) performs satisfactorily above 350° C., and up to 500° C., it is not limited only to such high-temperature environments and may, if desired, be used in a wet clutch designed to maintain a temperature at the friction generating surface (18) below 350° C. In additional non-limiting embodiments, all values and ranges of values within and including the aforementioned range endpoints are hereby expressly contemplated.

In still other embodiments, the friction material (10) includes a base fibrous material that supports the friction stability region of the friction material (10). The base fibrous material has a top surface and a bottom surface (e.g. the bonding surface (16) and the friction generating surface (18)

described above) that define a thickness of the base fibrous material which can be, in some embodiments, from 0.25 mm to 2 mm (e.g. $T_1$). The fibers (20) and particles of the friction adjusting agent (22) that form the friction stability region may be highly intermingled with the base fibrous material such that the top surface of the base fibrous material is generally coincident with the friction generating surface (18) of the friction material (10) or, in another embodiment, the fibers (20) and the particles of the friction adjusting agent (22) may be partially intermingled with the base fibrous material and form a surface layer up to 70 µm, up to 50 µm, up to 20 µm, or up to 10 µm thick such that the top surface of the base fibrous material is not coincident with the friction generating surface (18). A variety of characteristics of the friction material (10) may determine to what extent the fibers (20) and the particles of the friction adjusting agent (22) infiltrate, or accumulate on, the top surface of the base fibrous material. These characteristics include the porosity of the base fibrous material and the amounts of the fibers (20) and particles of the friction adjusting agent (22) included in the friction stability region. In various embodiments, the bottom surface of the base fibrous material is located adjacent to the substrate (32) and is typically coincident with the oppositely facing bonding surface (16) of the friction material (10). The (cured) resin (26/34) may be evenly distributed throughout the base fibrous material as well as any portion of the friction stability region located above the top surface of the base fibrous material to provide adherence, rigidity, and structural support. A typical weight percent of the (cured) resin (26/34) in the friction material (10), in various embodiments, is from 15 to 50, weight percent. In additional non-limiting embodiments, all values and ranges of values within and including the aforementioned range endpoints are hereby expressly contemplated.

In other embodiments, the friction stability region of the friction material (10) may be constructed to permit regular regeneration of the friction generating surface (18) which, in turn, allows the friction material (10) to maintain its intended frictional performance for extended periods when the temperature at the friction interface exceeds 350° C. The bulk structure of the base fibrous material may be provided by an arrangement of the fibers (20) and filler (24).

In still other embodiments, this disclosure may include any one or more elements, method steps, etc., as described in U.S. Pat. No. 6,630,416 and/or U.S. Patent App. Pub. No. 2013/0037373, each of which is expressly incorporated herein in its entirety in various non-limiting embodiments. Alternatively, any one or more elements described herein may be modified or may be further described using descriptions set forth in one or both of the aforementioned documents that are incorporated herein.

In other embodiments, the friction material (10), and/or any of the base (12), deposit (14), or resin (26/34), or any other components described above, may be free of metallic fibers, carbon fibers, carbon particles, carbonized carbon particles, resin powders, and/or combinations thereof.

In further embodiments, the friction adjusting agent (22) of the deposit (14) and the filler (24) of the base (12) are both diatomaceous earth and have the same morphology as would be understood by those of skill in the art. In such embodiments, the amount of the friction adjusting agent (22) and the filler (24) may be the same or may be different from each other.

Figure 3:
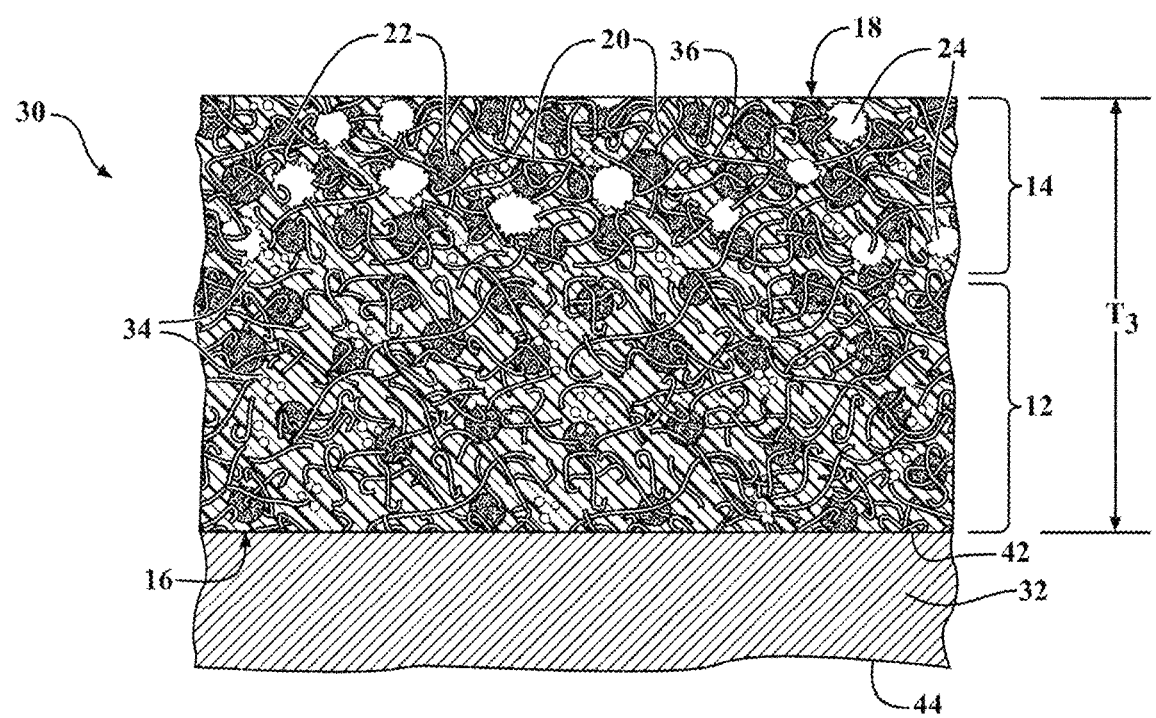
FIG. 3 is a cross-sectional view of a friction plate including a friction material and a substrate, wherein the friction material includes a base and a deposit.
Figure 4:
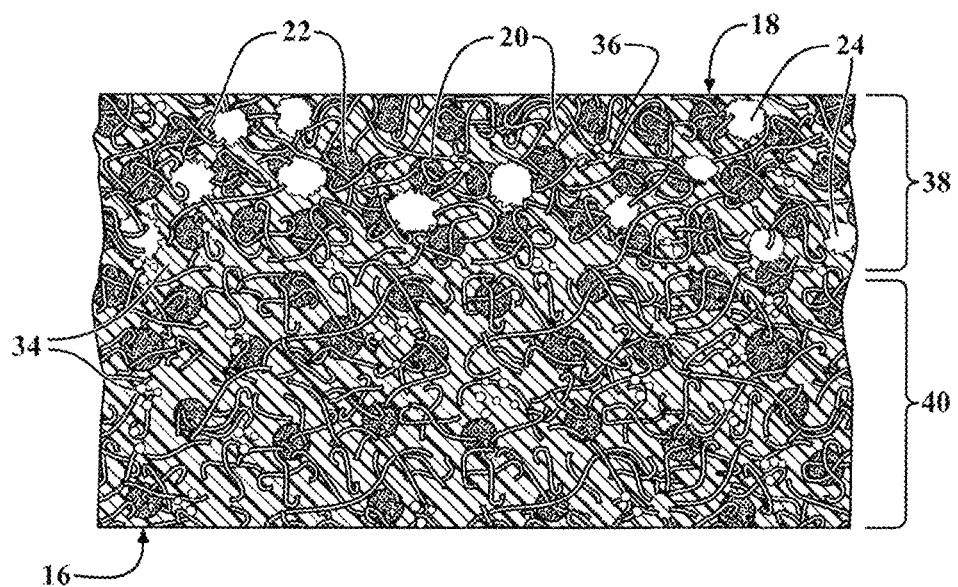
FIG. 4 is a cross-sectional view of another embodiment of a friction material including a base and a deposit.

Friction Plate:

As shown in FIG. 3, this disclosure also provides a friction plate (30) that includes the substrate (32) (e.g. a metal plate), as first introduced above. The substrate (32) has (at least) two surfaces (42, 44) and the friction material (10) is typically bonded to one or both of these surfaces (42, 44). Typically, the friction plate (30) is formed once the friction material (10) is adhered or bonded to one or both surfaces (42, 44). The bonding or adherence of the friction material (10) to the one or both surfaces (42, 44) may be achieved by any adhesive or means known in the art, e.g. a phenolic resin or any resin (26/34) described above. This disclosure also provides a clutch assembly that includes the friction plate (30) and a separator plate, as would be selected by one of skill in the art. This disclosure also provides a transmission (46) that includes the clutch assembly (48). The transmission (46) may be an automatic transmission or a manual transmission.

This disclosure also provides the friction plate (30) itself including the friction material (10) and the substrate (32) and a clutch assembly (48) including the friction plate (30) and a separator plate. The disclosure also provides a transmission (46) including the clutch assembly (48).

Method of Forming the Friction Material:

This disclosure also provides a method of forming the friction material. In various embodiments, the method includes the steps of (I) forming the base comprising the fibers (20) and the filler (24) to form at least a portion of the first outermost surface (16), (II) applying the friction adjusting agent (22) to the base (12) to form the deposit (14) and form at least a portion of the second outermost surface (18), (III) applying a vacuum to the base (12) comprising the friction adjusting agent (22) to form the gradated pattern, (IV) impregnating the base (12) and deposit (14) disposed in the gradated pattern with the resin (26, 34), (V) curing the resin (26, 34) in the impregnated base (12) and deposit (14) to form the friction material (10), and (VI) smoothing the second outermost surface (18) to a surface roughness of from 2 to 11 micrometers as determined by non-contact laser measurement according to ISO 25178, wherein the gradated pattern is measured in a direction from the second outermost surface (18) towards the first outermost surface (16) wherein a concentration of the deposit (14) disposed nearest the second outermost surface (18) is greater than a concentration of the deposit (14) disposed nearest the first outermost surface (16), and wherein at least a portion of the deposit (14) is exposed to the environment after the step of smoothing.

The step of (I) forming the base (12) may be accomplished by any method known in the art. Similarly, the step of (II) applying the friction adjusting agent (22) may be accomplished by any method known in the art. Moreover, the steps of (IV) impregnating and (V) curing may also be accomplished by any method known in the art.

Relative to the step of applying the vacuum, the vacuum may be applied at any pressure sufficient to form the friction material (10) and the gradated pattern. For example, the step of applying the vacuum may be further defined as applying the vacuum at a pressure of less than 7, 6, 5, 4, 3, 2, or 1, KPa. In some embodiments, the step of smoothing is further defined as grinding. In other embodiments, the step of smoothing is further defined as heat treating and/or pressing.

In various embodiments, the base (12) may be impregnated with the phenolic or phenolic based resin (26, 34) and then heated to a desired temperature for a predetermined length of time to form the friction material (10). The heating cures the phenolic resin (26, 34) at a temperature of 177° C.-232° C. (350° F.-450° F.). When other resins (26, 34) are present, such as a silicone resin, the heating cures the silicone resin at a temperature of 177° C.-232° C. (350°

F.-450° F.). Thereafter, the impregnated and cured friction material (10) may be adhered to the desired substrate (32) by suitable means.

EXAMPLES

Two examples of friction materials representative of this disclosure (Examples 1 and 2) are formed along with two comparative examples of a friction material that are not representative of this disclosure (Comparative Examples 1 and 2). After formation, Examples 1 and 2 and Comparative Examples 1 and 2 are evaluated to determine an amount of deposit on a surface of the friction material by X-ray fluorescence spectroscopy (XRF).

The compositions of Examples 1 and 2 and Comparative Examples 1 and 2 are set forth below in Table 1 wherein the Components in the Base are set forth in weight percent based on a total weight of the Base and wherein the components of the Deposit are set forth in pounds (lbs) based on 3000 ft$^2$ of surface of the Base.

TABLE 1

| Friction Material | Components | Comparative Example 1 | Comparative Example 2 | Example 1 | Example 2 |
|---|---|---|---|---|---|
| Base | Fibers | 30-50 wt % | 30-50 wt % | 30-50 wt % | 30-50 wt % |
|  | Filler | 55-70 wt % | 55-70 wt % | 60-70 wt % | 55-70 wt % |
| Deposit | Friction Adjusting Agents | — | 6-12 lbs/ 3000 ft$^2$ | 6-12 lbs/ 3000 ft$^2$ | 6-12 lbs/ 3000 ft$^2$ |
| Curable Resin | Phenolic Resin | 30-45 wt % | 30-45 wt % | 30-45 wt % | 30-45 wt % |
| Target Property | Weight of Paper (lb/3000 ft$^2$ of surface area) | 175-250 lbs | 175-250 lbs | 175-250 lbs | 175-250 lbs |
|  | Density (g/cm$^3$) | 0.5 to 0.75 | 0.5 to 0.75 | 0.5 to 0.75 | 0.5 to 0.75 |
| Vacuum Pressure | — | >7 KPa | >7 KPa | ≤7 KPa (Greater Vacuum than CE2) | ≤7 KPa (Greater Vacuum than E1) |

The amount of resin utilized is typically described in the art as "resin pick up." The amount of resin set forth in Table 1 is a weight percent based on a total weight of the base and the deposit together.

The Fibers include cellulose and aramid fiber.

The Filler includes carbon fiber, diatomaceous earth, silica, and graphite.

The Friction Adjusting Agents include diatomaceous earth and silica.

Figure 7:
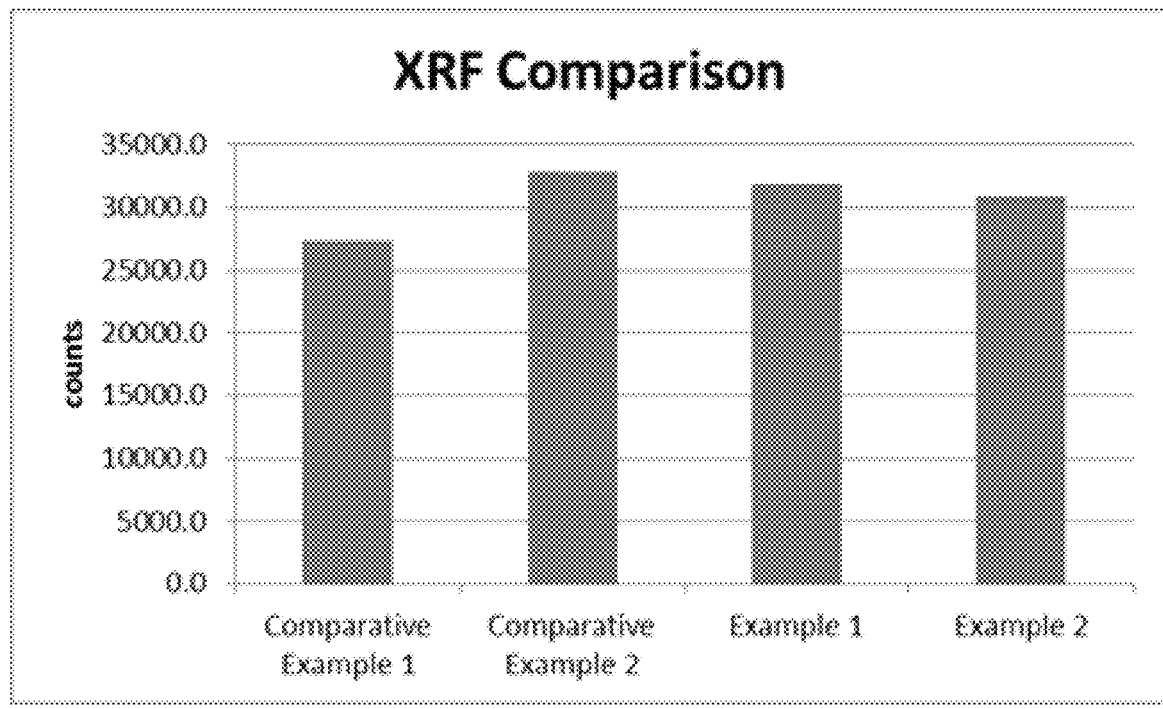
FIG. 7 is a bar-graph of the XRF results described in the Examples.

The results of the XRF analysis are set forth in FIG. 7. The results show that Comparative Example 1 has a very low amount of silicon on the surface of about 27,000 counts. The results also show that Comparative Example 2 has a very high amount of silicon on the surface of about 33,000 counts. These are expected because Comparative Example 1 has no deposit or friction adjusting agents added. Moreover, Comparative Example 2 is formed using a low vacuum such that no appreciable gradient is formed. Example 1 is formed using a stronger vacuum than Comparative Example 2. The results indicate that a lower amount of the silicon is present on the surface of about 32,000 counts. Example 2 is formed using a stronger vacuum than Example 1 and than Comparative Example 2. The results indicate that an even lower amount of the silicon is present on the surface of about 31,000 counts. These results indicate that the use of the vacuum pulls an amount of the silicon of the deposit into the friction material thereby forming a gradient or gradated pattern of the deposit in the friction material.

FIGS. 9A-C are Energy Dispersive Spectroscopy (EDS) maps of SEM images with iron (Fe) shown in bright grey as a central layer and silicone (Si) shown in white as specs dispersed throughout the two exterior layers of friction material. FIG. 9A is representative of Comparative Example 1, without a deposit present on a base. FIG. 9B is representative of Example 1, with a deposit which has partially migrated into a base. FIG. 9C is representative of Example 2, with a deposit fully migrated and integrated a base. In other words, FIG. 9C shows a friction material with a deposit which is disposed in a friction material in a gradated pattern.

Lowering the depth of the deposit and/or forming the gradated pattern can have many positive effects on the performance of the friction material. For example, the deposit may have better adhesion with the fibers thereby creating a strong, more durable friction material. Alternatively, the gradated pattern and/or lower the depth of the deposit may allow for the availability of post-processing techniques that as smoothing or grinding. Grinding is not typically a viable technique with deposited materials when the deposit is on the top of the base because the deposit would then be removed during the grinding. In addition, the post-processing, such as smoothing or grinding, can yield a smooth, uniform surface with the active deposit, as desired.

When the depth of the deposit is lowered in a gradated pattern, post processing is a viable option as is shown in FIGS. 10A and 10B. FIG. 10A is a non-contacting laser profilometry 3D image representative of a friction material and the outermost surface thereof with no post-process smoothing, such as grinding. FIG. 10B is a non-contacting laser profilometry 3D image representative of a friction material and an outermost surface thereof after post process smoothing. In FIG. 10B, the peaks are removed from the outermost surface, and consequently the contact area is higher on the smoothed outermost surface. The increase in the contact area of the outermost surface of the friction material shown in FIG. 10B yields improved frictional characteristics.

All combinations of the aforementioned embodiments throughout the entire disclosure are hereby expressly contemplated in one or more non-limiting embodiments even if such a disclosure is not described verbatim in a single paragraph or section above. In other words, an expressly contemplated embodiment may include any one or more elements described above selected and combined from any portion of the disclosure.

One or more of the values described above may vary by ±5%, ±10%, ±15%, ±20%, ±25%, etc. so long as the variance remains within the scope of the disclosure. Unexpected results may be obtained from each member of a Markush group independent from all other members. Each member may be relied upon individually and or in combination and provides adequate support for specific embodiments within the scope of the appended claims. The subject matter of all combinations of independent and dependent claims, both singly and multiply dependent, is herein expressly contemplated. The disclosure is illustrative including words of description rather than of limitation. Many modifications and variations of the present disclosure are possible in light of the above teachings, and the disclosure may be practiced otherwise than as specifically described herein.

It is also to be understood that any ranges and subranges relied upon in various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e. from 0.1 to 0.3, a middle third, i.e. from 0.4 to 0.6, and an upper third, i.e. from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

What is claimed is:

1. A friction material having a first outermost surface and a second outermost surface spaced apart from said first outermost surface, said friction material comprising:
   A. a base which forms a porous layer comprising fibers and fillers and defining at least a portion of said first outermost surface, wherein:
      i. said fibers are present in an amount of from 20 to 80 weight percent, based on a total weight of said base, and
      ii. said fillers are present in an amount of from 20 to 80 weight percent, based on a total weight of said base;
   B. a deposit which forms at least a portion of said second outermost surface and comprises a friction adjusting agent having a particle size of from 0.5 to 80 micrometers; and
   C. a resin disposed throughout said friction material;
   wherein said deposit is disposed in said friction material in a gradated pattern measured in a direction from said second outermost surface towards said first outermost surface wherein a concentration of said deposit disposed nearest said second outermost surface is greater than a concentration of said deposit disposed nearest said first outermost surface;
   wherein at least a portion of said deposit is exposed to the environment and said second outermost surface has a surface roughness of from 2 to 11 micrometers as determined by non-contact laser measurement according to ISO 25178;
   wherein said first outermost surface is disposed for adhesion to a metal plate and said second outermost surface is disposed for exposure to the environment; and
   wherein said porous layer further defines a lower quadrant disposed closest to said first outermost surface and an upper quadrant disposed closest to said second outermost surface, and wherein particles of said friction adjusting agent are disposed in said upper and lower quadrants in a gradated pattern measured in a direction from said upper quadrant towards said lower quadrant and wherein a concentration of particles disposed nearest the second outermost surface is greater than a concentration of particles disposed nearest the first outermost surface.

2. The friction material of claim 1 wherein said deposit has a thickness of from 10 to 300 micrometers.

3. The friction material of claim 1 wherein said friction adjusting agent comprises diatomaceous earth.

4. The friction material of claim 1 wherein said friction adjusting agent comprises silica, carbon, graphite, alumina, magnesia, calcium oxide, titania, ceria, zirconia, cordierite, mullite, sillimanite, spodumene, petalite, zircon, silicon carbide, titanium carbide, boron carbide, hafnium carbide, silicon nitride, titanium nitride, titanium boride, and combinations thereof.

5. The friction material of claim 1 wherein said friction adjusting agent comprises elastomeric particles.

6. The friction material of claim 1 wherein said friction adjusting agent is present in an amount of from 1 to 20 lbs. based on 3000 ft$^2$ of said friction material.

7. The friction material of claim 1 wherein said fibers comprise aramids, cellulose, or combinations thereof.

8. The friction material of claim 1 wherein said filler comprises diatomaceous earth.

9. The friction material of claim 1 wherein said resin is present in an amount of from 20 to 60 weight percent based on a total weight of said base and said deposit.

10. The friction material of claim 1 wherein said resin is a phenolic resin or modified phenolic resin.

11. The friction materials of claim 1 wherein said resin is curable.

12. The friction material of claim 1 wherein said resin is cured.

13. A friction plate comprising a metal plate having at least two surfaces and said friction material of claim 12 bonded to at least one of said two surfaces.

14. A clutch assembly comprising the friction plate of claim 13 and a separator plate.

15. A transmission comprising the clutch assembly of claim 14.

16. A method of forming a friction material having a first outermost surface and a second outermost surface spaced apart from the first outermost surface, wherein the friction material comprises:
  (1) a base which forms a porous layer comprising fibers and fillers and defining at least a portion of the first outermost surface and wherein:
    (a) the fibers are present in an amount of from 20 to 80 weight percent, based on a total weight of the base, and
    (b) the fillers are present in an amount of from 20 to 80 weight percent, based on a total weight of the base;
  (2) a deposit which forms at least a portion of the second outermost surface and comprises a friction adjusting agent having a particle size of from 0.5 to 80 microns; and
  (3) a resin disposed throughout the friction material, wherein the deposit is disposed in the friction material in a gradated pattern, said method comprising the steps of:
  (I) forming the base comprising the fibers and the filler to form at least a portion of the first outermost surface,
  (II) applying the friction adjusting agent to the base to form the deposit and form at least a portion of the second outermost surface,
  (III) applying a vacuum to the base comprising the friction adjusting agent to form the gradated pattern,
  (IV) impregnating the base and deposit disposed in the gradated pattern with the resin,
  (V) curing the resin in the impregnated base and deposit to form the friction material, and
  (VI) smoothing the second outermost surface to a surface roughness of from 2 to 11 micrometers as determined by non-contact laser measurement according to ISO 25178, wherein the gradated pattern is measured in a direction from the second outermost surface towards the first outermost surface wherein a concentration of the deposit disposed nearest the second outermost surface is greater than a concentration of the deposit disposed nearest the first outermost surface, wherein at least a portion of the deposit is exposed to the environment after the step of smoothing, wherein the first outermost surface is disposed for adhesion to a metal plate and the second outermost surface is disposed for exposure to the environment, and wherein the porous layer further defines a lower quadrant disposed closest to the first outermost surface and an upper quadrant disposed closest to the second outermost surface, and wherein particles of the friction adjusting agent are disposed in the upper and lower quadrants in a gradated pattern measured in a direction from the upper quadrant towards the lower quadrant and wherein a concentration of particles disposed nearest the second outermost surface is greater than a concentration of particles disposed nearest the first outermost surface.

17. The method of claim 16 wherein the step of applying the vacuum is further defined as applying a vacuum at a pressure of less than 7 KPa.

18. The method of claim 16 wherein the step of smoothing is further defined as grinding.

19. The method of claim 16 wherein the deposit has a thickness of from 10 to 300 micrometers.

20. The method of claim 16 wherein the friction adjusting agent comprises diatomaceous earth.

* * * * *